(12) United States Patent
Sakamoto (10) Patent No.: US 7,195,437 B2
(45) Date of Patent: Mar. 27, 2007

(54) TAPPING SCREW HAVING FUNCTION OF HOLDING FEMALE SCREW SHAVINGS

(75) Inventor: Hiroyuki Sakamoto, Fukuchiyama (JP)

(73) Assignee: Nitto Seiko Co., Ltd., Kyoto (JP)

( * ) Notice: Subject to any disclaimer, the term of this patent is extended or adjusted under 35 U.S.C. 154(b) by 410 days.

(21) Appl. No.: 10/610,079

(22) Filed: Jun. 30, 2003

(65) Prior Publication Data
US 2005/0186047 A1 Aug. 25, 2005

(30) Foreign Application Priority Data
Jul. 2, 2002 (JP) .............................. 2002-193781

(51) Int. Cl.
- F16B 1/00 (2006.01)
- F16B 37/00 (2006.01)
- F16B 39/00 (2006.01)

(52) U.S. Cl. ................. 411/82.3; 411/82.1; 411/82.2; 411/914; 411/258; 411/930; 411/428; 411/DIG. 1

(58) Field of Classification Search ....... 411/82.1–82.3, 411/914, 258, 930, 428, DIG. 1; 361/825 TS
See application file for complete search history.

(56) References Cited

U.S. PATENT DOCUMENTS

| | | | | |
|---|---|---|---|---|
| 3,351,115 A | * | 11/1967 | Boehlow ................ 411/168 |
| 3,485,132 A | * | 12/1969 | Hanny et al. ............ 411/548 |
| 3,642,937 A | * | 2/1972 | Deckert et al. ............ 525/58 |
| 3,746,068 A | * | 7/1973 | Deckert et al. ........... 411/258 |
| 3,814,156 A | * | 6/1974 | Bachmann et al. ....... 411/258 |
| 4,040,328 A | * | 8/1977 | Muenchinger ............ 411/412 |
| 4,161,971 A | * | 7/1979 | Arzberger et al. ........ 141/362 |
| 4,164,971 A | * | 8/1979 | Strand ..................... 411/301 |
| 4,285,378 A | | 8/1981 | Wallace |
| 4,497,916 A | * | 2/1985 | Cooke et al. ............. 523/176 |
| 4,536,524 A | * | 8/1985 | Hart et al. ............... 523/176 |
| 4,545,712 A | | 10/1985 | Wallace |
| 4,632,944 A | * | 12/1986 | Thompson ................ 522/11 |
| 4,657,460 A | * | 4/1987 | Bien ...................... 411/258 |
| 5,000,636 A | * | 3/1991 | Wallace .................. 411/258 |
| 5,188,496 A | * | 2/1993 | Giannuzzi ............... 411/386 |
| 5,426,130 A | * | 6/1995 | Thurber et al. ........... 522/14 |
| 5,795,120 A | * | 8/1998 | Hurdle ................... 411/386 |
| 5,827,924 A | * | 10/1998 | Park et al. ............... 525/123 |
| 5,895,186 A | * | 4/1999 | Giannuzzi et al. ........ 411/82 |
| 6,372,872 B1 | * | 4/2002 | Port et al. ............... 526/317.1 |
| 6,375,872 B1 | * | 4/2002 | Chao ..................... 264/4.33 |
| 6,896,462 B2 | * | 5/2005 | Stevenson et al. ......... 411/82 |

(Continued)

FOREIGN PATENT DOCUMENTS

CN 1165921 C 11/1997

(Continued)

*Primary Examiner*—Robert J. Sandy
*Assistant Examiner*—David Reese (57) ABSTRACT

The present invention provides a screw comprising a head and a threaded shank, wherein the shank is covered with a coating at least 60% of the length thereof from the end, the coating includes microcapsules that contain a viscous fluid with an appropriate level of viscosity. Shavings, including powdered shavings due to friction and exfoliations that may be generated during the screwing process, will be held, so that they will not fall, at the surface of the shank by the viscous fluid coming out of the microcapsules.

17 Claims, 6 Drawing Sheets

2 : HEAD
3 : SHANK
9 : COATING MEMBER
10 : THREAD

U.S. PATENT DOCUMENTS

2002/0136616 A1   9/2002   Birkelbach

FOREIGN PATENT DOCUMENTS

| | | |
|---|---|---|
| CN | 1340135 A | 3/2002 |
| JP | 60-44613 | 3/1985 |
| JP | 08-021429 | 1/1996 |
| JP | 10-220451 | 8/1998 |
| JP | 2002-070824 | 3/2002 |

* cited by examiner

FIG.1

2 : HEAD
3 : SHANK
9 : COATING MEMBER
10 : THREAD

TAPPING SCREW HAVING FUNCTION OF HOLDING FEMALE SCREW SHAVINGS

This application is based on application NO. 2002-193781 filed in Japan, the contents of which are hereby incorporated by reference.

BACKGROUND OF THE INVENTION

1. Field of the Invention

The present invention relates to a screw to be screwed into a prepared hole in a workpiece, particularly to a female-thread-formation shaving holding screw that prevents shavings generated during the female-thread forming process from falling, when the screw is screwed into a prepared hole inside of which female threads are already formed, as well as when the screw forms female threads while being screwed into a prepared hole in a relatively soft workpiece.

2. Description of the Related Art

Figure 12:
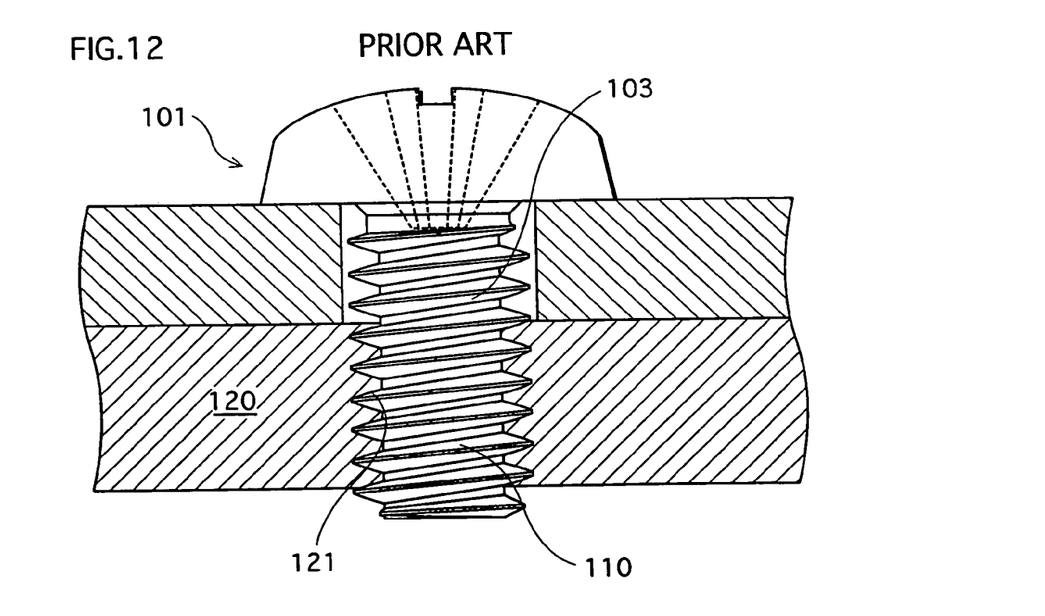
FIG. 12 is a cross sectional front view to illustrate how a tapping screw of the prior art is screwed into a workpiece.

In recent years, there is increasing need for installing electronic device parts, and screws are often used to install parts and covers. As a general procedure, as shown in FIG. 12, a prepared hole (not shown in the drawing) is provided in a workpiece 120, and a tapping screw 101 is to be screwed into the prepared hole so that the threads 110 on the shank 103 form the female threads 121 inside the prepared hole.

As for a material of which the workpiece 120 is made, materials that have relatively high recyclability are chosen in consideration of lightness in weight and environmental issues of recent years. For example, aluminum alloys and magnesium alloys are often used.

In particular, recently there are many items in which those materials are used as the following: personal computers; communication devices including mobile phones and the like; digital electric home appliances including digital cameras, digital video cameras, mini discs and the like; devices related to intelligent transport systems; and automobile parts. The workpieces made of the aforementioned materials which are often used in these products have tendency of becoming more and more lightweight and compact. Also, electric circuits used as parts of electronic devices are required to be lightweight and miniaturized; accordingly, there are developments to make screws more and more miniaturized in the present circumstances. Especially, there is an increasing demand for applying magnesium alloys to those products because of their advantageous properties such as being lightweight and energy-saving.

When such miniaturized parts need to be fixed onto a soft workpiece, tapping screws form female threads inside prepared holes while being screwed into the prepared holes to fix those parts onto the workpiece. When these female threads are formed during the screwing process, shavings such as powdered shavings due to friction and exfoliations are generated because of friction forces and deformation of the prepared holes beyond the yield point of the workpiece. These shavings may fall onto parts. Also the shavings sticking to the threads may fall when the screws are taken out of the holes. Thus, there is fear of damaging the devices or sometimes even causing a fire when the shavings fall onto an electric circuit of a printed circuit board and develop a short circuit.

When the workpiece is made of a soft material, during the process of forming female threads with tapping screws, normal tapping screws are likely to suffer from friction heat due to their designs in which the width of each root in the threads is small. Consequently, there may be a situation where a tapping screw is burnt onto the workpiece and does not get screwed in all the way, and we may have what is called a stick-out, which means that the bearing surface of a screw head is not in contact with the workpiece. Particularly, since magnesium alloys are soft and brittle, fine particles are likely to be generated, and they cause adhesion in the space between the tapping screw and the threads during the screwing process; therefore, it is not possible to achieve self-tapping action, which means that the screw forms female threads while being screwed into the workpiece, and it is necessary to form female threads in advance inside the prepared hole.

In order to fix some parts onto a workpiece, however, even when a normal screw is screwed into the workpiece after female threads are formed in advance inside the prepared hole in the workpiece, there is a possibility that a few shavings may be generated between the screw and the workpiece and fall, and this could still be one of the main causes of troubles in electronic devices. Moreover, since it is necessary to perform an assembly step of forming female threads in advance, the manufacturing cost increases, and a problem may arise that there is a limit to the possibility of supplying inexpensive products.

SUMMARY OF THE INVENTION

The object of the present invention is to solve the problems mentioned above and ensure that the screwing process can be performed in an efficient manner, as well as to improve reliability in the assembling of electronic devices by having the shavings adhered to and held by the screw constantly, the shavings being generated during the screwing process.

This object can be achieved by a screw to be screwed into a prepared hole in a workpiece, comprising: a head having a drive to be engaged with a driver bit; a shank having threads and being integrally formed with the head; and a coating covering at least 60% of a total length of the shank, starting from an end of the shank opposite to the head, wherein the coating includes microcapsules that contain a viscous fluid with a predetermined level of viscosity.

With this arrangement, when a part is fixed onto a soft workpiece with a screw, even if the screw directly forms female threads while being screwed into the prepared hole in the workpiece, it is possible to arrange it so that the shavings, such as powdered shavings due to friction and exfoliations that are generated during the screwing process, adhere to the viscous fluid coming out of the microcapsules in the coating, and to ensure that those shavings are held so that they do not fall from the prepared holes.

In addition, since those shavings are prevented from falling, there will be no possibility that shavings fall onto and stick to precision electronic parts, and thus it is possible to eliminate a cause of malfunctions such as short circuits developed in the circuits of electronic devices and to eliminate a cause of fires. Furthermore, when the screw is taken out of the hole, it is also possible to prevent the shavings sticking to the threads from falling, and there will be no possibility that a malfunction is induced at times of repairing the devices.

It is also acceptable to have an arrangement in which part of the shank that is on the end side and includes at most one of the threads is a female-thread forming portion, wherein an included angle of the thread in the female-thread forming portion is larger than an included angle of each of the threads in a rod portion, which is part of the shank on the head side, or an external diameter of the thread in the female-thread forming portion is larger than an external diameter of each of the threads in the rod portion, or both of an included angle and an external diameter of the thread in the female-thread forming portion is larger than those of each of the threads in the rod portion.

With this arrangement, it is possible to make the gap between the female threads and the threads of the screw relatively wide, so that the shavings come into the gap and sufficiently adhere to and are held by the viscous fluid. In addition, it is possible to reduce resistance against the screwing force during the screwing process, to reduce the friction heat, and to obtain anti-loosening effects because the resistance is larger at the time of loosening the screw having once been screwed is due to the restoring force of the female threads formed in the workpiece made of a soft material.

It is further acceptable to have an arrangement wherein the threads each have an included angle of 50 degrees or smaller so that the width of each root in the threads is relatively larger, or at each of the threads, a pressure flank angle is smaller than a leading flank angle.

With this arrangement, when a tapping screw forms female threads into a workpiece made of a soft material, friction heat is less likely to be generated, and the screw is less likely to be burnt onto the workpiece during the screwing process, and also adhesion action is restricted; therefore, it is possible to prevent what is called a stick-out of a screw, which means that that the bearing surface of the screw head is not in contact with the workpiece. Particularly, magnesium alloys are soft and brittle and tend to generate fine particles, but those fine particles will also adhere to the screw without failure; therefore, the threads on the shank and the female threads will not cause adhesion due to the friction heat during the screwing process. Thus, it is possible to have the screw form female threads while the screw is being screwed into the workpiece, and it is not necessary to form female threads in advance inside the prepared hole. Consequently, the assembly step of forming female threads in advance becomes unnecessary, and the manufacturing cost of the products can be reduced, and it is possible to supply inexpensive products.

Here, it is desirable to have an arrangement wherein thickness of the coating is 30% to 90% inclusive of a height of each thread from a root thereof.

Further, it is desirable to have an arrangement wherein the viscosity of the viscous fluid in the microcapsules is 200 cP to 500 cP inclusive.

Furthermore, it is desirable to have an arrangement wherein the viscous fluid maintains fluidity for at least six months from when the screw is used for a first time. When fluidity is maintained for a long time, even after the screw is screwed into the workpiece, the viscous fluid is still able to have shavings adhered thereto without becoming solid; and thus, the screw is able to maintain the adhesive action for shavings for a long time and is reusable even when the screw is taken out of the hole and gets screwed into a workpiece again.

In addition, it is desirable to have an arrangement wherein a flash point of the viscous fluid is 260 degrees centigrade or higher. With this arrangement, even if the screw should generate heat due to friction during the screwing process, it will not catch fire, and the safety level is high in terms of fire prevention.

In addition, it is desirable to have an arrangement wherein the viscous fluid has copper-corrosion resistance, stress crack resistance against a plastic resin member, electric non-conductance, lubricity, rust-proofing effect, and water repellency. With this arrangement, the viscous fluid does not have a bad influence on the circuit printed board attached to the workpiece because, for example, it will not infiltrate into the resin or make it brittle. Thus, the reliability of the products will be improved.

Furthermore, it is desirable to have an arrangement wherein a particle diameter of each of the microcapsules is 100 μm to 300 μm inclusive. With this arrangement, most of the coating will adhere to the roots of the threads, and the microcapsules containing the viscous fluid will also be present in abundance at the roots of the threads; therefore, it is possible to have the shavings adhered to the roots without failure. Also, when a normal screw having this coating is screwed into female threads formed in advance, it is possible to have a few shavings generated between the screw and the workpiece adhered to the coating and to eliminate a main cause of troubles of electronic devices, in the same fashion.

Additionally, it is acceptable to have an arrangement wherein the coating is formed by applying a coating material whose main components are the microcapsules, a resin binder, and a pigment.

With this arrangement, it is possible to identify each screw, and to easily distinguish the screw to be used when screws have different colors according to their usages, their nominal diameters, or the like. In addition, since organic solvents are not used in the coating material, which is a material used for the coating, it does not have a bad influence to human bodies and the atmosphere, and it is preferable in consideration of safety and sanitary conditions and environmental issues.

Furthermore, it is acceptable to have an arrangement wherein the workpiece has, at an entrance of the prepared hole from which the screw enters, a counterbore having a diameter that is larger than a diameter of the prepared hole and is smaller than a diameter of the head of the screw. With this arrangement, when a screw has once been screwed into a workpiece and then is taken out of the hole, even if the shavings adhered to the screw come out along with the threads, the shavings will be collected in the counterbore; therefore, special advantageous effects can be achieved by which, for example, the shavings including powdered shavings due to friction and exfoliations will not be scattered on the workpiece, as well as it is possible to easily eliminate them as necessary.

BRIEF DESCRIPTION OF THE DRAWINGS

These and other objects, advantages and features of the invention will become apparent from the following description thereof taken in conjunction with the accompanying drawings which illustrate a specific embodiment of the invention.

In the drawings.

DESCRIPTION OF THE PREFERRED EMBODIMENTS

The following explains embodiments of the present invention with reference to FIGS. 1 to 11.

Figure 1:
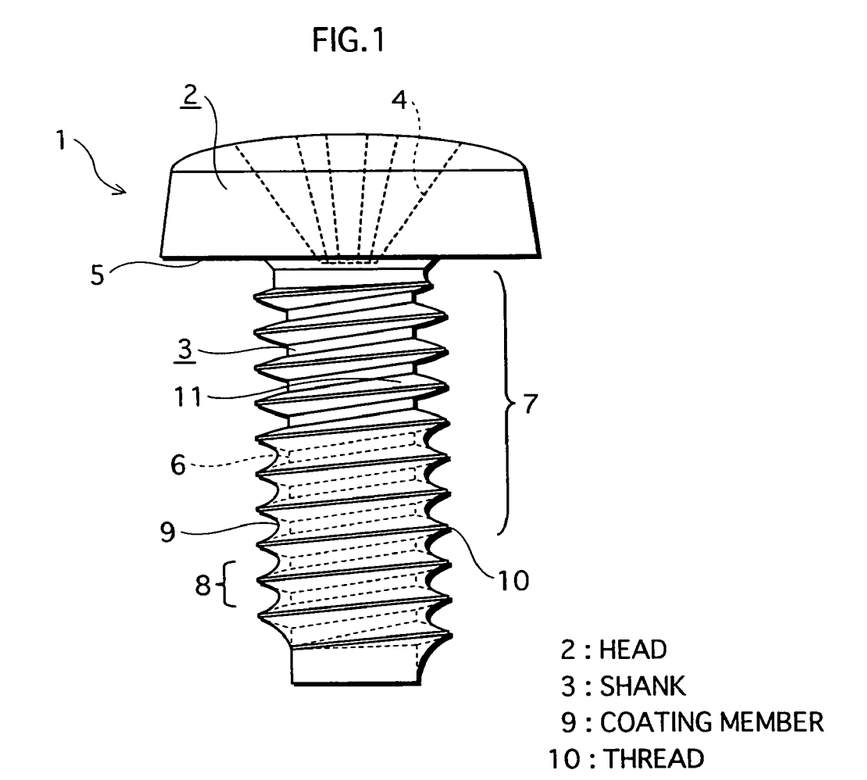
FIG. 1 is a front view of the screw of an embodiment of the present invention.
Figure 2:
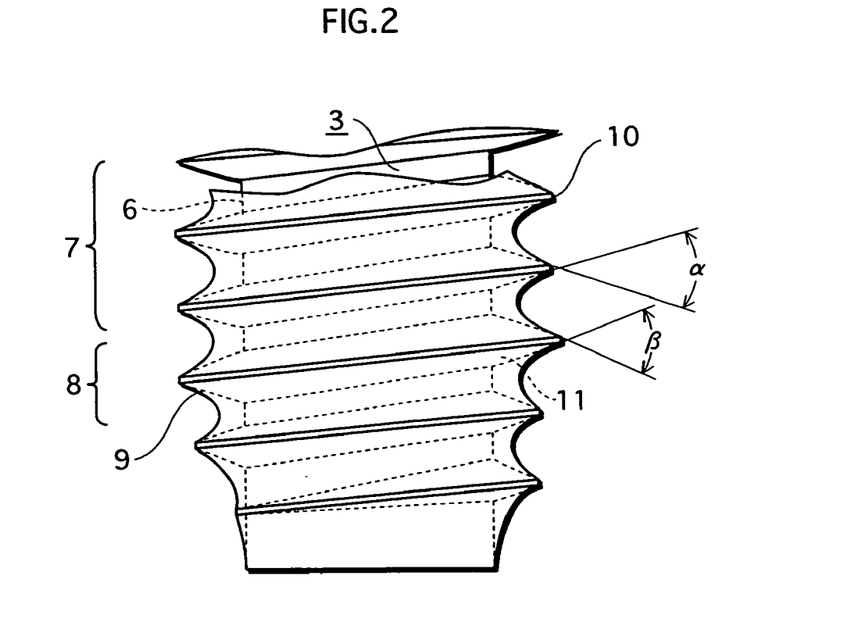
FIG. 2 is an enlarged front view of the main structure of the screw shown in FIG. 1.

In FIGS. 1 and 2, a tapping screw 1 comprises a head 2 and a shank 3, the shank 3 being integrally formed with the head 2 and having threads 10 on the external surface thereof.

A drive pit 4, which is a cross-shaped conical recess, is formed in the head 2 of the tapping screw 1 on the axial line of the shank 3, as a part of a drive of the screw to be engaged with a driver bit (not shown in the drawing). In this case, the drive is presented as the drive pit 4 being a cross-shaped conical recess; however, the drive may be a square-shaped pit, a hexagonal-shaped pit, or a slot of other shapes, or a hole of other shapes, and is not limited as described above as long as it is in a form that is normally available.

The bearing surface 5 of the head 2 has the cylinder-shaped shank 3 integrally formed therewith, the diameter of the shank 3 being smaller than the diameter of the head 2. The shank 3 has threads 10 that are formed with a predetermined pitch. The threads 10 on the shank 3 each have an included angle of 50 degrees or smaller, and the pitch of the threads 10 is made to be relatively wider so that the width of each root 6 of the tapping screw 1 is relatively larger than that of a normal small screw.

The shank 3 includes a rod portion 7 which is on the head side and has a constant external diameter. The shank 3 also includes a female-thread forming portion 8 which is on the end side and is a continuum of the rod portion 7. The included angle β of the thread in the female-thread forming portion 8 is slightly larger than the included angle α of each of the threads in the rod portion 7. It would be desirable to arrange it so that these included angles α and β have a ten-degree difference so that the included angle β of the thread of the female-thread forming portion 8 is larger. The female-thread forming portion 8 is at most one thread. The height of each of the threads 10 on the end side of the female-thread forming portion 8 is arranged to be shorter than the height of each of the threads 10 in the rod portion 7 so that, during the screwing process, the part of the screw with the shorter threads can easily go into the prepared hole (not shown in the drawing) in the workpiece. With these arrangements, the tapping screw 1 is able to mitigate, to a level as low as possible, friction caused at the time of forming female threads 21 inside the prepared hole in the workpiece 20 during the screwing process.

Further, in the area that is at least 60% of the length from the end of the shank 3 toward the head and all around the circumference, a coating material, which does not include organic solvents and is water-soluble, for example, is applied so as to form a coating 9.

The coating 9 is formed so that it is adhered to the flank planes 11 and the roots 6 of the threads 10. It would be best if the coating 9 is adhered so as to cover 30% to 90% of the height of each thread starting from the roots between the threads 10. The coating 9 includes microcapsules (not shown in the drawing) that are densely disposed, and the microcapsules contain a viscous fluid in liquid form that maintains fluidity (wettability) for a long time. Viscosity of the viscous fluid is 200 cP to 500 cP inclusive, which is enough for having the female-thread forming shavings adhered thereto. If the viscosity is at a lower level than this, the coating material may drip while being applied, and if the viscosity is at a higher level than this, the coating may rise between the threads too high. With the range of viscosity mentioned above, it is possible to obtain characteristics by which the fluidity can be maintained for a long time even the ambient temperature is as high as approximately 130 degrees centigrade. It would be desirable if the fluidity is maintained specifically for at least six months after the screw is used for the first time, and it would be more desirable if the fluidity is maintained for about five years.

Figure 5:
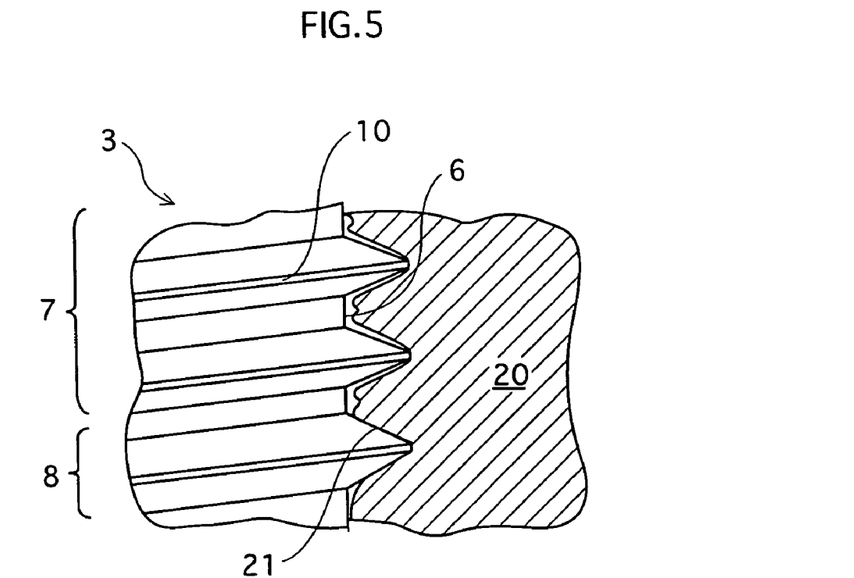
FIG. 5 is a cross sectional view of the main structure of the screw in FIG. 1 to illustrate how the threads are screwed into the prepared hole.

The evaporation temperature and flash point of the viscous fluid is 260 degrees centigrade or higher. This viscous fluid is superior in terms of copper-corrosion resistance and stress crack resistance against a plastic resin member. It also has electric non-conductance, lubricity, rust-proofing effect, and water repellency. In addition, the particle diameter of each of the microcapsules is 100 μm to 300 μm inclusive, which is an appropriate size for supplying a maximum amount of viscous fluid in each pitch of the tapping screw 1. The viscosity of the coating material whose main components are the microcapsules, a binder to bind them together, and a pigment is approximately 110 cP at a normal temperature. It is possible to color the coating material as necessary with a colored pigment. When the coating material is colored, it is possible to quickly recognize if the coating process has been performed on the shank 3 of the tapping screw 1 or not. When the tapping screw 1 having the coating 9, which is formed by applying the coating material, is screwed into the prepared hole in the workpiece 20, the microcapsules are ruptured by the pressure at the time of forming the female threads. Then, the viscous fluid leaks, and the shavings 23 generated during the female-thread forming process, including powdered shavings due to friction and exfoliations, will adhere to and be held by the threads 10. Accordingly, when the female threads 21 are formed inside the prepared hole in the workpiece 20 by the female-thread forming portion 8 of the shank 3, as shown in FIG. 5, there will be a gap between the female threads 21 and the threads 10 in the rod portion 7, and thus, the shavings 23 will adhere to and be held at the gap because of the viscous fluid coming out of the microcapsules.

Figure 3:
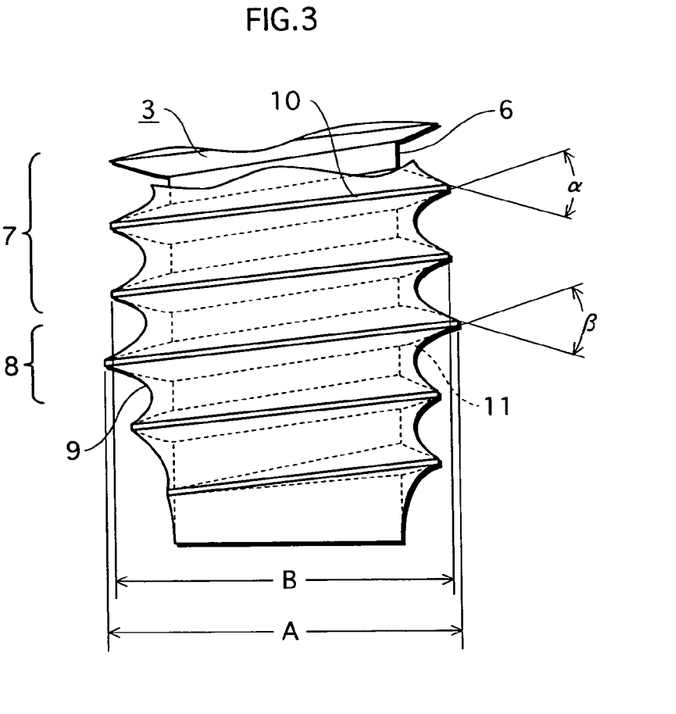
FIG. 3 is an enlarged front view of the main structure of the screw of another embodiment of the present invention.
Figure 4:
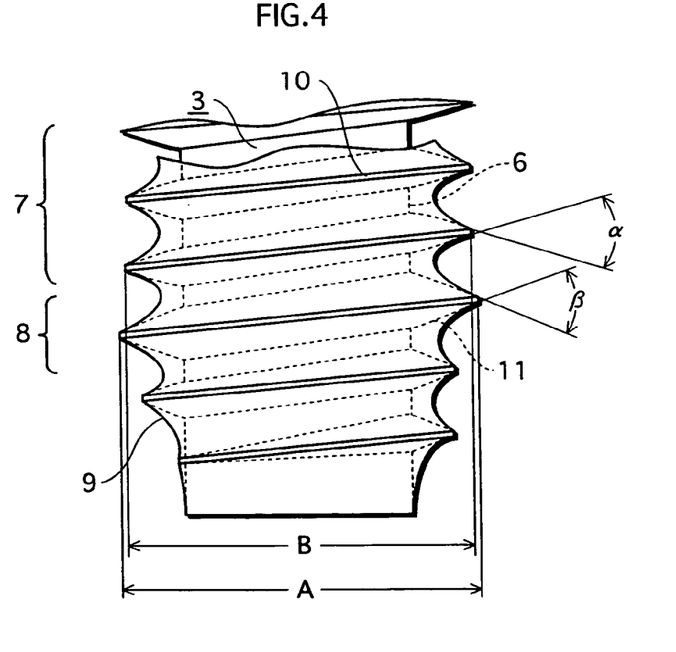
FIG. 4 is an enlarged front view of the main structure of the screw of yet another embodiment of the present invention.

In addition, FIGS. 3 and 4 show examples in each of which the shape of the threads of the tapping screw 1 with the aforementioned arrangement has been slightly modified. In FIG. 3, the included angle α of each thread in the rod portion 7 is 50 degrees or smaller, which is the same arrangement as the embodiment above, and the included angle β of the thread in the female-thread forming portion 8, which is a continuum to the rod portion 7 and is on the end side of the shank, is the same as the included angle α of each thread in the rod portion 7. The external diameter A of the thread in the female-thread forming portion 8 is slightly larger then the external diameter B of each thread in the rod portion 7, and the female-thread forming portion 8 is at most one thread. With this arrangement, also, it is possible to reduce the resistance during the screwing process as mentioned earlier, and the shavings 23 will adhere to and be held by the threads 10 on the shank 3 without failure because of the coating 9 applied to the threads 10. In FIG. 4, the arrangements of the female-thread forming portion 8 mentioned so far are combined. Specifically, the included angle β of the thread of the female-thread forming portion 8 is arranged to be slightly larger then the included angle α of each thread in the rod portion 7, as well as the external diameter A of the thread of the female-thread forming portion 8 is arranged to be slightly larger than the external diameter B of each thread in the rod portion 7. Also with this arrangement, it is possible to have similar effects.

Figure 6:
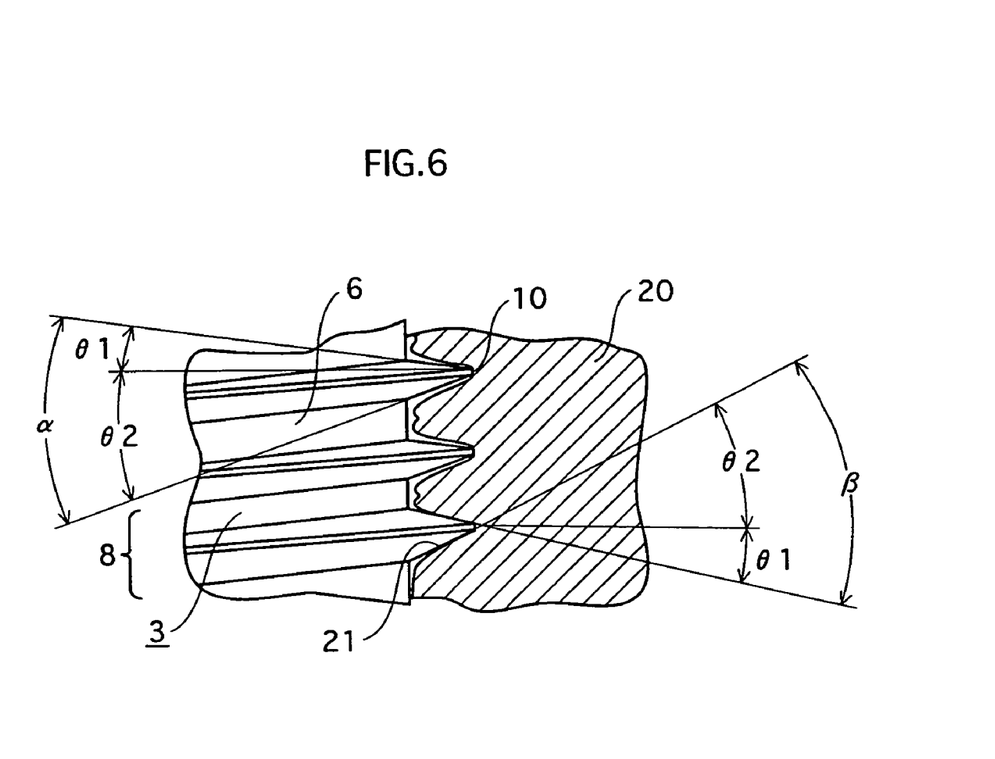
FIG. 6 is a cross sectional view of the main structure to illustrate how asymmetric threads are screwed into the prepared hole.

Further, although the pressure flank angle is arranged to be equal to the leading flank angle at each of the threads 10 in the embodiments above, FIG. 6 shows an arrangement of threads 10 having unequal angles, which means that, at each of the threads 10, the pressure flank angle θ1 is smaller than the leading flank angle θ2. It is also acceptable to have an arrangement wherein the threads 10 having unequal angles are formed in the rod portion 7, and as a continuum of the threads 10, the included angle β of the thread in the female-thread forming portion 8 is larger than the included angle α of each thread in the rod portion 7 by approximately 10 degrees. It is also acceptable to have an arrangement wherein the included angles of the threads in the rod portion 7 and the female-thread forming portion 8 are equal and the external diameter of the thread of the female-thread forming portion 8 is slightly larger than the external diameter of each thread in the rod portion 7. It is also acceptable to combine these arrangements. With any of these arrangements, it is possible to obtain further advantageous effects of preventing loosening.

Figure 7:
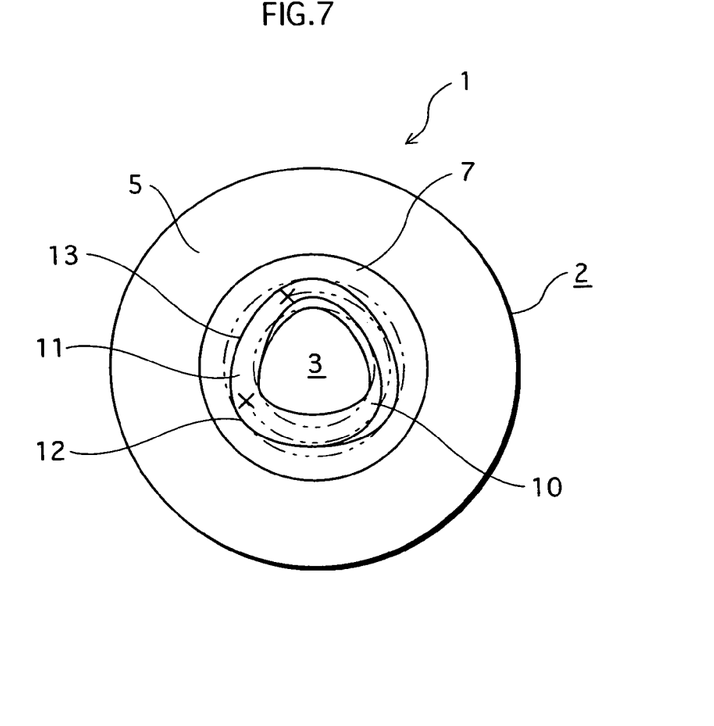
FIG. 7 is a bottom view that shows another embodiment of the present invention.
Figure 8:
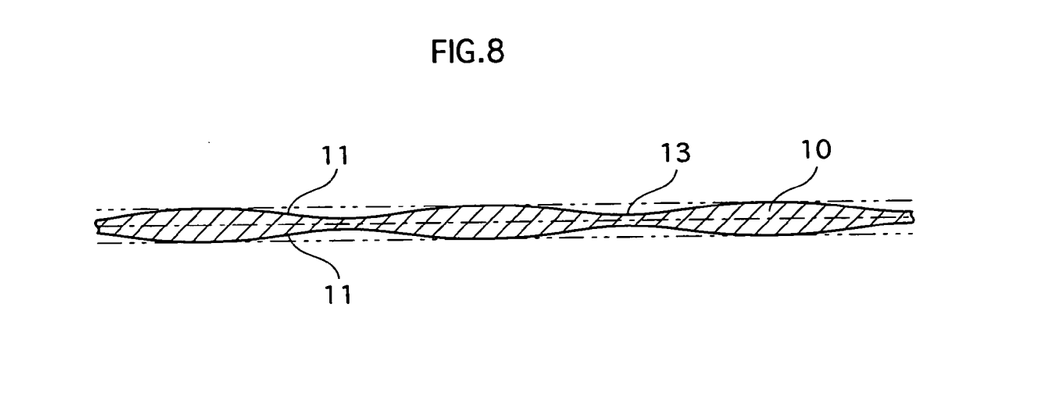
FIG. 8 is an enlarged developed cross sectional view along the line X—X in FIG. 7.
Figure 10:
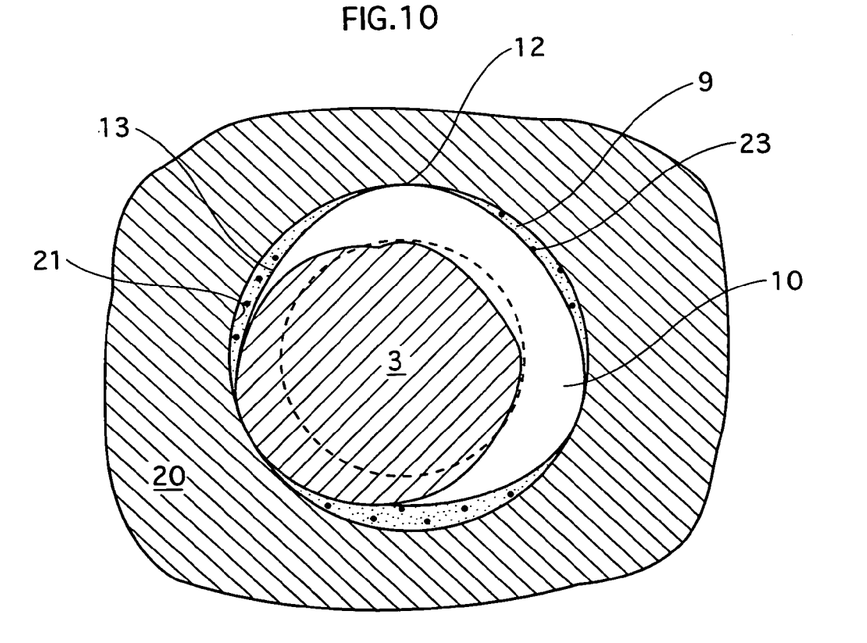
FIG. 10 is an enlarged cross sectional view to illustrate how the screw in FIG. 7 is screwed into the workpiece.

FIGS. 7 and 8 show a non-circular shank 3 of the tapping screw 1 and a developed cross sectional view of the threads 10. The threads 10 are what is called trilobular threads, which means that one thread, i.e. one turn of the threads 10, includes three vertexes that each have the maximum thread radius. Between the vertexes 12, there are relief portions 13 that each have the minimum thread radius. The cross sectional view of the threads is shown in FIG. 8, which illustrates that each of the relief portions 13 is smaller in thickness than the thickness of the threads at those three vertexes, when compared as a locus of a circle of a constant radius from the axial point of the shank 3. When the tapping screw 1 is used to form female threads 21 inside the prepared hole in the workpiece 20, those three vertexes 12 form the female threads 21; therefore, there will be gaps between the relief portions 13 and the female threads 21. Since the coating 9 with the same main components are also applied to the threads 10, the shavings 23 generated during the process of forming female threads 21 with the tapping screw 1 will adhere to and be held by the relief portions 13, as shown in FIG. 10.

In addition to the shank with the arrangements mentioned above, it is also acceptable to have an arrangement wherein four grooves (not shown in the drawing) are formed in each pitch of the threads 10 on the shank 3 so that the shavings adhere to and are held by a plurality of grooves. With this arrangement of threads, it is also possible to have a larger quantity of shavings 23 adhered thereto and held.

Figure 9:
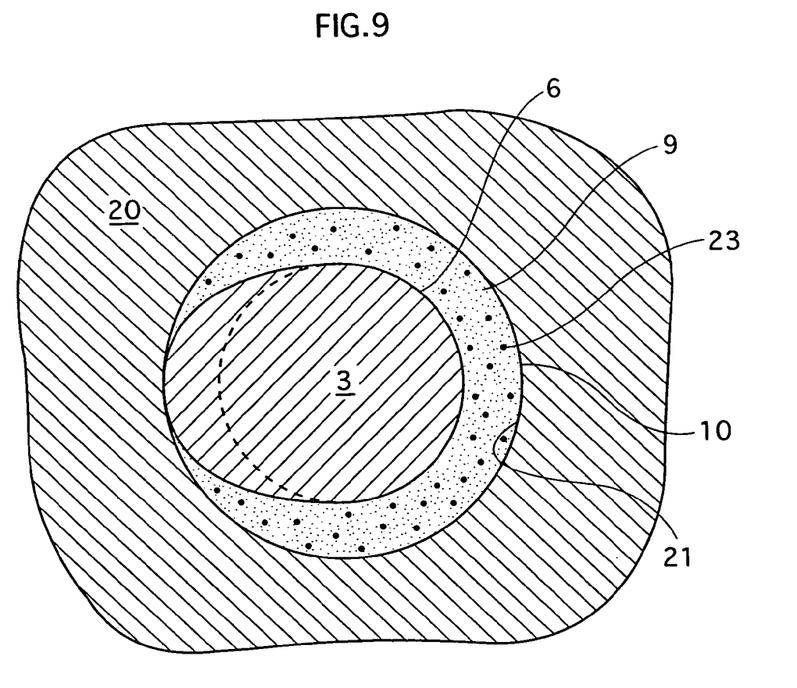
FIG. 9 is an enlarged cross sectional view to illustrate how the screw in FIG. 2 is screwed into the workpiece.

When the tapping screw 1 with the arrangements so far mentioned is screwed into a prepared hole provided in advance in the workpiece 20, the threads 10 of the tapping screw 1 form female threads 21 during the screwing process. The shavings 23 generated during this process will all adhere to and be held by the coating 9 applied to the threads 10, at the flank planes 11, the roots 6, and the relief portions 13 of each thread as well as at the grooves in some cases, as shown in FIGS. 9 and 10. With this arrangement, the shavings 23, which are generated when the tapping screw 1 is screwed into the workpiece or taken out of the hole, will not fall on the parts.

Figure 11:
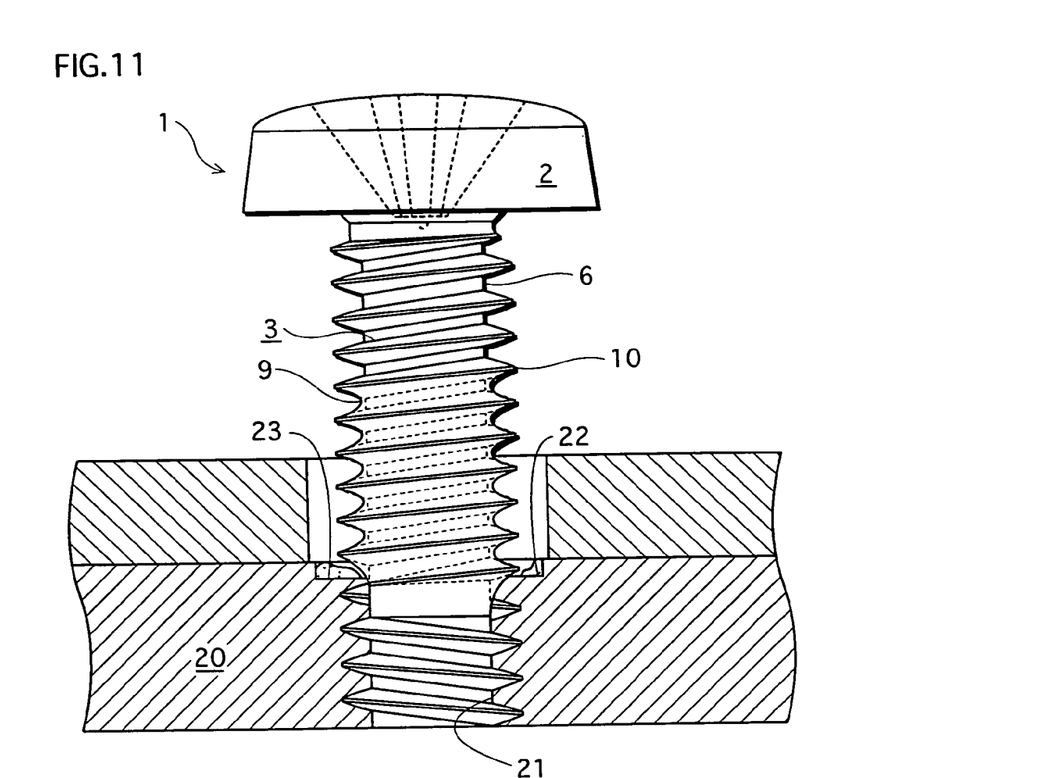
FIG. 11 is a cross sectional view of the main structure to illustrate how the screw of the present invention is taken out of the workpiece.

When the tapping screw 1 that once has been screwed into the workpiece is taken out of the hole, the coating 9 applied to the shank 3 of the tapping screw 1 comes up away from the female threads 21 along with the threads 10 while holding the shavings 23 adhered thereto. At this time, as shown in FIG. 11, the shavings 23 adhered to the coating 9 will be collected in a counterbore 22 that is formed in advance at the entrance of the prepared hole from which the tapping screw 1 enters, and has a diameter that is larger than the diameter of the prepared hole and is smaller than the diameter of the head of the tapping screw 1. Thus, it is possible to prevent the shavings 23 from being scattered around when the tapping screw 1 is taken out of the hole.

As additional information, in the embodiments above, the tapping screw 1 having the threads with special arrangements is explained; however, it is also acceptable to have an arrangement wherein female threads 21 are formed in advance inside the prepared holes in the workpiece 20, and the tapping screw 1 is screwed into the female threads 21. In such a case, it is relatively less likely that shavings 23 are generated, but when the tapping screw 1 in this case also has the similar coating 9 applied to the shank 3, it is possible to ensure that the shavings 23 are prevented from falling on printed circuit boards of electronic devices.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A screw for a prepared hole in a workpiece, comprising:
   a head adopted for engagement with a driver bit;
   a shank integrally formed with the head having a lived portion connected to the head and an end portion with an end opposite to the head, the shank having external threads from the head to the end with a female-thread forming portion at the end portion having an external diameter larger than the external diameter of the threads on the head portion; and
   a coating covering at least 60% of a length of the shank, starting from the end, the coating including microcapsules containing viscous fluid with a viscosity between 200 cP to 500 cP a characteristic of retaining fluidity for at least a six month period of time from a first arc of the screw, wherein a flash point of the viscous fluid is at 260 degrees centigrade or higher.

2. The screw of claim 1, wherein
   an included angle of the thread in the female-thread forming portion is larger than an included angle of each of the threads in the head portion.

3. The screw of claim 1, wherein
   the threads each have an included angle of 50 degrees or smaller.

4. The screw of claim 1, wherein
   at each of the threads, a pressure flank angle is smaller than a leading flank angle.

5. The screw of claim 1, wherein
   thickness of the coating is 30% to 90% inclusive of a height of each thread from a root thereof.

6. The screw of claim 1, wherein
the viscous fluid has copper-corrosion resistance, stress crack resistance against a plastic resin member, electric non-conductance, lubricity, rust-proofing effect, and water repellency.

7. The screw of claim 1, wherein
a particle diameter of each of the microcapsules is 100 μm to 300 μm inclusive.

8. The screw of claim 1, wherein
the coating is formed by applying a coating material whose main components are the microcapsules, a resin binder, and a pigment.

9. The screw of claim 1, wherein
the workpiece has, at an entrance of the prepared hole from which the screw enters, a counterbore having a diameter that is larger than a diameter of the prepared hole and is smaller than a diameter of the bead of the screw.

10. A screw for a prepared hole in a workpiece, comprising:
a head adapted for engagement with a drive bit;
a shank integrally fined with the head, having a head portion connected to the head, and a end portion with an end, opposite to the head, the shank having external threads from the the head to the end with a female-thread forming portion at the end portion, the female thread forming portion having a thread angle that is larger than the thread angle of the threads in the head potion; and
a coating covering at least 60% of the length of the shank starting from the end, the coating including microcapsules containing viscous fluid with a predetermined level of viscosity between 200 cP to 500 cP with a characteristic of retaining fluidity for at least a six month period of time from an initial installation of the screw, wherein a flash point of the viscous fluid is at 260 degree centigrade or higher.

11. The screw of claim 10, wherein
the threads each have an included angle of 50 degrees or smaller.

12. The screw of claim 10, wherein
at each of the threads, a pressure flank angle is smaller than a leading flank angle.

13. The screw of claim 10, wherein
thickness of the coating is 30% to 90% inclusive of a height of each thread from a root thereof.

14. The screw of claim 10, wherein
the viscous fluid has copper-corrosion resistance, stress crack resistance against a plastic resin member, electric non-conductance, lubricity, rust-proofing effect, and water repellency.

15. The screw of claim 10, wherein
the coating is formed by applying a coating material whose main components are the microcapsules, a resin binder, and a pigment.

16. The screw of claim 10, wherein the counting is water soluble.

17. The screw of claim 10, wherein the shank has trilobular threads to retain shavings.

* * * * *